United States Patent [19]

Klötzner et al.

[11] 4,107,717

[45] Aug. 15, 1978

[54] METHOD AND APPARATUS FOR ADDRESSING A DIGITAL MEMORY

[75] Inventors: Winfried Klötzner, Schwieberdingen; Rolf Daumer, Merklingen; Wolfgang Busse, Hildesheim; Hans-Christoph du Mont, Renningen, all of Fed. Rep. of Germany

[73] Assignee: Robert Bosch GmbH, Stuttgart, Fed. Rep. of Germany

[21] Appl. No.: 742,921

[22] Filed: Nov. 17, 1976

[30] Foreign Application Priority Data

Nov. 18, 1975 [DE] Fed. Rep. of Germany ....... 2551680

[51] Int. Cl.[2] ......................... G06F 15/20; F02D 5/00

[52] U.S. Cl. .............................. 364/431; 123/32 EA; 364/900

[58] Field of Search ................ 235/150.21, 150.2, 151; 123/32 AE, 32 EA; 364/431, 200 MS File, 900 MS File

[56] References Cited

U.S. PATENT DOCUMENTS

| | | | |
|---|---|---|---|
| 3,816,717 | 6/1974 | Yoshida et al. | 235/150.21 |
| 3,838,397 | 9/1974 | Watson et al. | 235/150.21 X |
| 3,846,625 | 11/1974 | Sasayama | 235/150.21 X |
| 3,904,856 | 9/1975 | Monpetit | 235/150.21 |
| 3,909,601 | 9/1975 | Yamawaki et al. | 235/150.21 X |

*Primary Examiner*—Joseph F. Ruggiero
*Attorney, Agent, or Firm*—Edwin E. Greigg

[57] ABSTRACT

A central digital memory contains data relating values of operational variables of an installation to values of a stored parameter. The central memory is addressed in parallel via input lines carrying the address of the stored data. The address is generated by selecting one of several discrete input lines leading to an address selector memory which contains preliminary addresses related to the various operational states of the installation. A portion of the preliminary address is delivered directly to the central memory whereas another portion is used to preset a counter. If the particular operational state is dependent on another parameter, for example temperature, a temperature-dependent clocking frequency is admitted to the counter and alters its contents which are then used to supplement the first portion of the address already delivered to the central memory. If no temperature dependency exists, the second portion of the address is passed on without change.

25 Claims, 11 Drawing Figures fo
P9
P8
WL
Tϑ
PE
X
27
88
89
90
91
92
93
ZFϑ
81
76
82
83
84
85
86
87
AD1'
AD2'
AD3'
AD4'
AD5'
AD1
AD2
AD3
AD4
AD5
KNS
29
28
74
75
77
78
79
UG
OG
WL

METHOD AND APPARATUS FOR ADDRESSING A DIGITAL MEMORY

BACKGROUND OF THE INVENTION

The invention relates to a method and an apparatus for addressing a central memory for interrogating it with respect to stored data. The addressing takes place in dependence on external and time-dependent operational conditions of the engine which, itself, is controlled by the data contained in the central memory. In addition, one or more of the operational engine conditions may be dependent on other parameters, for example the engine temperature. The method and apparatus according to the invention for addressing a central memory is useful especially when used in connection with an electronic fuel injection system which uses the data in the central memory to generate a correction frequency which it transmits to a central processor for producing control pulses which are used in operating the fuel injection valves of the engine. However, the method and apparatus according to the invention is useful not only in the field of fuel injection but may be used wherever the operation of a system requires control in accordance with operational conditions which may be of very complicated form.

In order to define the duration of the fuel injection control pulses, which, in turn, are a measure of the fuel supplied to the engine, the induction tube manifold of the engine contains an air flow rate meter of any suitable construction and so embodied as to produce an electrical signal as a function of the air flow rate through the induction tube. In order to obtain an approximately stoichiometric fuel mixture, the signal thus produced, which is proportional to the air flow rate, is then divided by the rpm of the crankshaft, i.e., the number of suction strokes per unit time, in order to produce a fuel control datum. For this purpose, in a known fuel injection system in which the length of the pulses is formed by a monostable multivibrator having a capacitor in its feedback path, the capacitor is charged with a constant charging current during a time which is inversely proportional to the crankshaft rpm and is subsequently discharged with an equally fixed discharging current which, however, is inversely proportional to the air flow rate. The duration of the discharge of the capacitor is used as a measure of the duration of the fuel injection pulses. Connected behind this first stage in the known system is a so-called multiplier stage which operates in similar manner as the first monostable flip-flop and which receives correction signals related to other operational conditions of the engine which then are used by the multiplier stage to produce the final injection control pulses $t_i$. In such known fuel injection systems, there is required an adaptation to the particular type of engine, so that it must be possible to change the system to correspond to the number of cylinders and to permit other adjustments and corrections.

The system according to the present invention relates to an electronic fuel injection system of substantially different construction, being based on digital operation and thus useable for universal applications, for example for generating highly precise injection control pulses for the fuel injection valves of an internal combustion engine. The data associated with a particular internal combustion engine are stored in a central fixed memory and are cyclically interrogated so as to correct the fuel injection control signal. In order to perform this cyclic interrogation and correction, there is required an address computer.

OBJECT AND SUMMARY OF THE INVENTION

It is a principal object of the invention to provide a universally useable address computer for addressing a central memory for the purpose of interrogating it regarding the data stored therein. The manner of addressing the central memory is to depend on several external operational conditions of the installation. The installation is preferably, but not necessarily, an internal combustion engine, and in that case the addressing may depend on at least one operational state, in particular the temperature, which is time-dependent and influences the values of the data of the other operational conditions in a previously known manner.

This object is achieved according to the present invention in a process for addressing a central memory by deriving switching signals from prevailing operational states of the installation, for example an internal combustion engine, and to feed these switching signals to a decoder which is cyclically traversed and which produces from the combination of operational states of the installation a single signal which directly controls an address memory. A first part of the address contained in the address memory and associated with the particular input signal is immediately transferred to the central memory while the remaining portion of the address is placed in a counter as an initial value. During a controllable gating period, the counter receives a clock pulse train whose frequency depends on at least one operational condition, for example the temperature, which is used by the counter to count upward from its previously set value so that, after the gating period is ended, the counter has a particular remaining content which is used as the final portion of the complete address fed to the central memory. If the operational state of the engine is such as to be temperature-independent, the gate permitting the passage of the pulse train to the counter remains closed.

The invention further provides an apparatus for carrying out the above-described process which includes a decoder circuit which receives switching signals related to the operational condition of the installation, for example an internal combustion engine, and cyclically generates a single signal which is fed to an address memory containing a plurality of preliminary addresses. The first portion (MSB) of these addresses is directly fed to the central memory for the purpose of a coarse selection of the correct data region while the remainder of the address is fed to a counter which is thus set while a temperature-dependent frequency is received by the counter to alter the set value and thus provide the remaining portion of the complete address fed to the central memory.

An address memory constructed and operated in this manner makes possible a very precise selection of a data word contained in a central memory for any possible combination of operational states of an installation, in particular of an internal combustion engine, and for the use of that datum for the processing of fuel injection control pulses. Furthermore, the apparatus of the invention is capable of processing the instantaneous values of time-variable quantities and to associate them with a stored datum without interpolation or approximations. The apparatus according to the invention can use and process the actually prevailing functional dependencies which are quantized for the purpose of storage in a digital memory.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Before turning to the detailed description of an exemplary preferred embodiment of the method and apparatus according to the invention, it should be noted that they are not limited to the application described here, i.e., the generation of fuel injection control pulses in an electronic fuel injection system. On the contrary, they are capable of application wherever an installation is to be controlled in dependence on particular operational states and on previously supplied operational information of any degree of complexity. Any possible kind and combination of operational conditions are assumed to be known and would be contained in data stored in a central memory. This memory would be interrogated with the aid of addresses which are constructed from the prevailing relatively complex operational states by the apparatus now to be further described.

In order to aid in the understanding of the construction and operation of the method and the apparatus according to the invention they will be described in relation to a fuel injection system such as shown in simplified form in FIG. 1.

Figure 1:
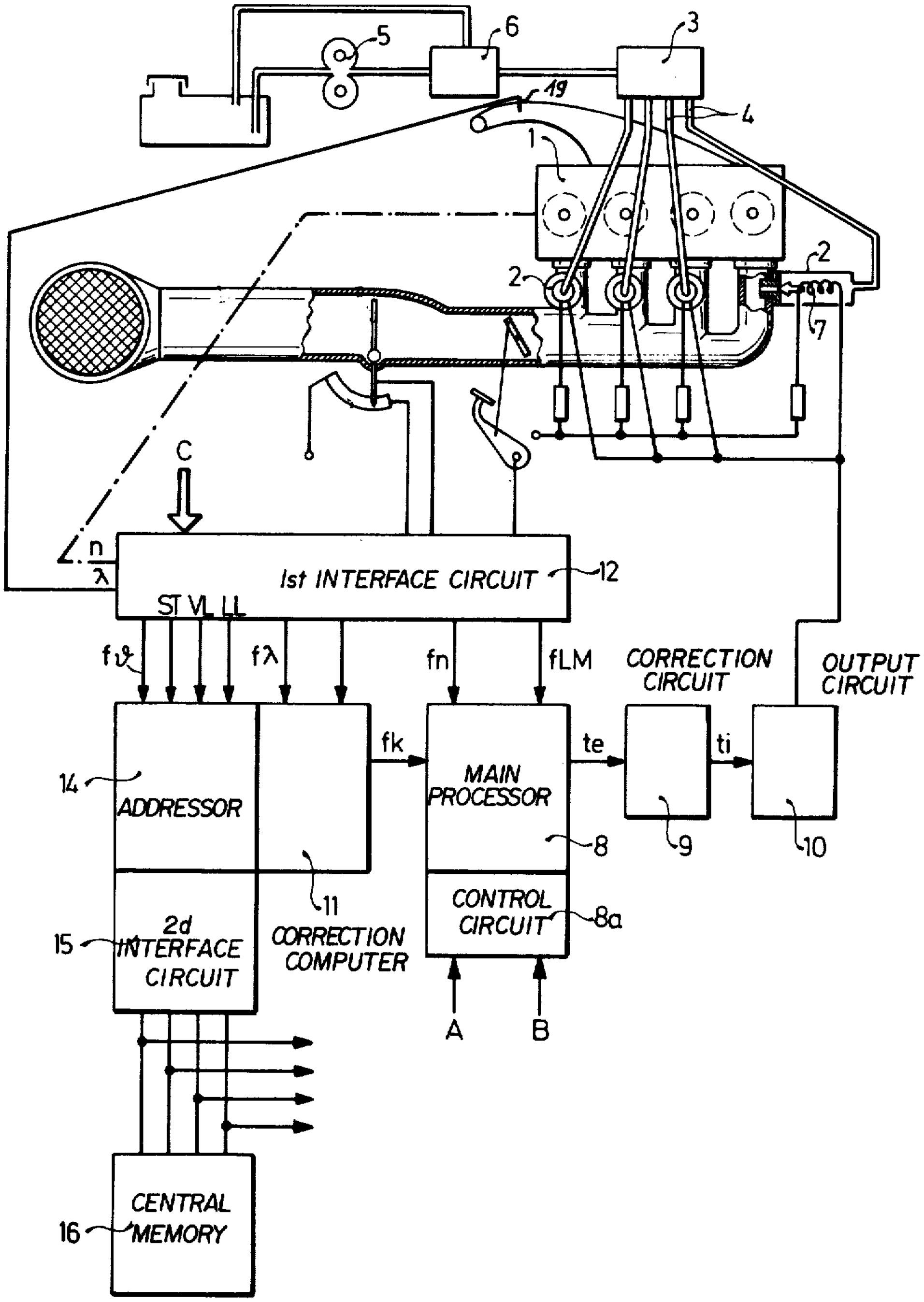
FIG. 1 is a schematic representation of an overall fuel injection system and an associated internal combustion engine, the main control circuitry being shown for simplicity in block diagrams.

FIG. 1 illustrates an internal combustion engine, for example a 4-cylinder, 4-cycle engine 1 having four fuel injection valves 2 which receive fuel to be injected from a distributor 3 via tubulations 4. Associated with the engine is an electrically driven fuel supply pump 5 and a pressure regulator 6 which holds the fuel pressure at some predetermined value, for example 2 atm gauge pressure. The system also includes an electronic injection device which defines the duration of the fuel injection control pulses that are delivered to the magnetic coil 7 of the injection valves in such a manner as to open the latter for a predetermined period of time during which an appropriately metered fuel quantity is delivered for example into the induction manifold or immediately into the particular combustion chamber associated with each cylinder.

The fuel injection system of FIG. 1 includes a central main processor 8 which generates a pulse sequence $t_e$ which controls the duration of the fuel injection control pulses. The pulse train $t_e$ is fed to a voltage correction circuit 9 which delivers corrected pulses $t_i$ to an output stage 10 which actually feeds the magnetic coils of the injection valves. The main processor 8 has an associated control portion 8a which receives input signals A and B which cause a switch-over of the system to 6, 8 or more cylinders.

As already mentioned, the entire system illustrated in FIG. 1 operates digitally, in particular the information delivered to the main processor is contained in the form of pulse trains of varying frequency. The main processor 8 and an associated computer 11, which will be designated a correction computer, receives signal trains or switching signals from an interface circuit 12 which are produced from input signals related to and derived from substantially the instantaneous behavior of the internal combustion engine. The main processor 8 thus is supplied with a pulse train $f_{LM}$ related to the air flow rate, a pulse train $f_n$ related to the engine speed (rpm) and a correction pulse train $f_K$ produced by the correction computer 11. The main processor uses these pulse trains to generate the output pulses $t_e$ which define the quantity of fuel supplied to the engine in dependence on the prevailing operational state.

Associated with the correction computer 11 is an address computer 14 which is connected to an interface circuit 15 and hence to a central memory 16 which contains data related to a particular internal combustion engine and which may be interrogated concerning these data in dependence on a prevailing operational state or combination of states of the engine. Thus, by reprogramming the memory or supplying a different memory, the system according to the invention provides a universal applicability of the fuel injection system for any and all internal combustion engines.

The present invention is primarily related to the address computer 14 and to portions of the interface circuits 12 and 15 which engage the central memory 16. After providing an address associated with a particular operational state, the address computer 14 receives from the central memory 16 a binary word associated with this particular address which, in the exemplary embodiment illustrated is an 8-bit word which is fed to the correction computer 11 for further processing and for generating a correction frequency $f_K$. The frequency $f_K$ is used for counting down the contents of a counter located within the main processor 8, this counter having been counted upwardly during an interval in synchronism with the engine rpm at a frequency $f_{LM}$ related to the air throughput. The time period $t_e$ which extends from the onset of downward counting until the counter content is zero or some predetermined number is then used as a measure for the duration of the pulses generated by the main processor 8. As may be seen in FIG. 2, the central memory 16 is divided into regions 1, 2, 3 . . . $n$. The central memory contains data related to all of the operational states of the engine, whether dependent or independent of engine temperature. In the particular exemplary embodiment, there are defined fourteen individual operational states which are associated with fourteen regions 1 to *n* of the central memory 16. If the particular operational state of the engine whose associated datum is to be taken from the memory for further processing is temperature independent, then the associated region consists of a single 8-bit storage location. However, it is possible that some particular state of the engine, for example warm-up, has a considerable dependence on engine temperature. In that case, the central memory 16 must deliver a datum which corresponds to the amount of fuel needed by the engine at this particular time and also at the particular temperature. Of course, the amount of fuel actually required is previously known and is accordingly programmed into the central memory 16 in advance.

In the exemplary embodiment shown, the central memory 16 has a maximum of 32 8-bit words for temperature dependent conditions resulting in the allocations shown in Table 1 below. The glossary of abbreviations used in Table 1 is as follows:

WL = warm-up,
STWL = warm-up after engine starting,
KNS = correction for post-starting operation,
AA is vehicle start increase, i.e., increased fuel supplied during the onset of motion of the vehicle (run-up),
TL is partial load condition,
LL is idling, and
VL is full load.

Associated with these conditions are certain time constants and these are:

T λ K is the time constant for λ-control (short term),
T λ L is the time constant for λ-control (long term),
TNS is the time constant for post-starting,
TAA1 is the time constant for vehicle acceleration with warm engine,
TAA2 is the time constant for vehicle acceleration with cold engine,
STtp is starting pulse duration, and
$t_{min}$ = minimum injection time.

The above referred-to λ-control describes a process of supplying fuel, i.e., of controlling the duration of injection pulses by a closed control process in which the condition of an oxygen sensor located in the exhaust system of a vehicle is used to derive information on the composition of the initial fuel-air mixture. Such a control process is known and will not be explained in further detail inasmuch as it relates only to the improved understanding of the apparatus in general.

TABLE I

CENTRAL MEMORY ALLOCATION

| Word address | Content | Number of words | |
|---|---|---|---|
| 128 159 | WL | 32 | temperature dependent |
| 160 175 | STWL | 16 | temperature dependent |
| 176 191 | KNS | 16 | temperature dependent |
| 192 207 | AA | 16 | temperature dependent |
| 208 | TL | 1 | temperature independent |
| 209 | LL | 1 | temperature independent |
| 210 | VL | 1 | temperature independent |
| 211 | T λ K | 1 | temperature independent |
| 212 | T λ L | 1 | temperature independent |
| 213 | TNS | 1 | temperature independent |
| 214 | TAA1 | 1 | |
| 215 | TAA2 | 1 | |
| 216 | STtp | 1 | |
| 217 | $t_{min}$ | 1 | |

The allocation of the central memory depicted in Table 1 indicates that the initial location is the location 128, although this is an arbitrary choice. However, if a memory having a total of 256 words is used, then such a memory may also be used for the purpose of feeding other single-purpose computers in a motor vehicle, for example ignition computers, transmission control computers, etc. In the present case, the locations 128 to 217 of the central memory 16 are occupied by the above-referred to regions 1 to 14. Table 1 also indicates which of the operational states of the engine are temperature-dependent which requires that the prevailing temperature must be considered in the formation of the address fed to the central memory.

When the central memory 16 receives the desired address at its inputs, its output produces the associated datum for further processing.

Figure 2:
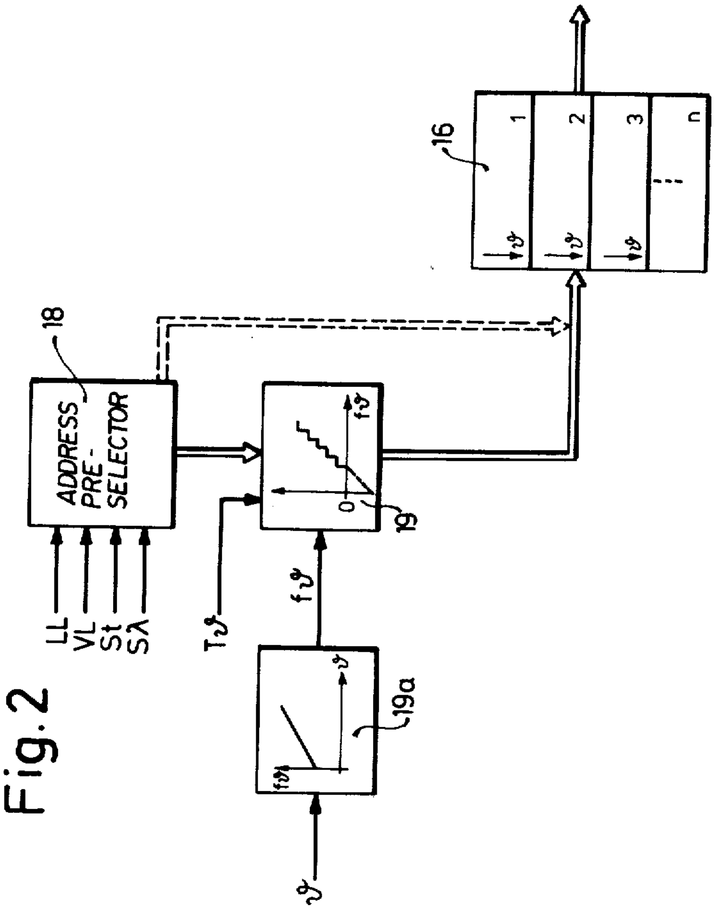
FIG. 2 is a block circuit diagram of the address processor according to the invention in a basic configuration.

The generation of the addresses, of which there are 89 in the present example, takes place by means of the components shown in simplified form in FIG. 2. It will be noted that the operational condition labeled WL, i.e., the warm-up of the engine, will require the highest number of quantization steps in a motor vehicle, in this example a total of 32 quantization steps corresponding to 32 memory locations. Thus, when the central memory is interrogated regarding the warm-up operation of the engine, it will supply one of 32 values each having a length of 8 bits. In the other temperature dependent operational states, namely warm-up during starting, in the correction factor for post-start increase and in that for vehicle acceleration it is sufficient to use 16 quantization steps, i.e., 16 memory locations, resulting in a total of 80 memory locations required for the various temperature dependent engine states. If the memory is associated exclusively with a fuel injection system of the above-described type, its total storage content would need to be only 89 8-bit words and could be embodied as a read-only memory (ROM) or programmable read-only memory (PROM).

The 14 various operational states of the engine are defined in the present exemplary embodiment by four switching signals, namely an idling signal LL, a full load signal VL, a start signal ST and a λ-control signal Sλ. All these control signals are derived in relatively simple manner, for example by means of switches located at the gas pedal or the ignition, and are fed to an address preselector circuit 18. A signal related to engine temperature is derived by means, for example, of an NTC resistor located in the coolant of the engine. This sensor supplies the input parameter $\theta$ to the block labeled 19 in FIG. 2. The address preselector 18 includes a synchronizing circuit which places the input signals LL, VL, ST and Sλ into a common time frame. The circuit 18 further includes a selector circuit and a fixed value memory (ROM or PROM) with a capacity of 14 8-bit words. The circuit 18 uses the information contained in the 14 previously mentioned operational states of the engine and derives therefrom a preliminary address. This preliminary address is divided into a 3-bit word which is part of the complete 8-bit address for the central memory 16 and into a second 5-bit word which is fed to a counter 19 for setting the counter to a predetermined initial value. The 3-bit word fed directly to the central memory 16 is composed of the three most significant bits (MSB) whereas the 5 LSB (least significant bits) are fed to the counter 19 whose capacity is required to be only 5 bits in the present example.

The counter 19 is a customary counter composed, for example, from so-called J-K flip-flops which may be loaded in parallel and which may be clocked in a predetermined gating time $T_\theta$ at a clock frequency $f_\theta$. The block labeled 19a receives the temperature signal $\theta$ and generates therefrom a temperature-dependent frequency especially a linearly related frequency. The element 19 may be, for example, a resistance-controlled oscillator which, ideally, generates a pulse train whose frequency $f_\theta$ is a linear function of the temperature. Oscillators of this type, in which a variation of a resistance changes the output frequency, are known and the particular oscillator 19a will thus not be described in further detail.

During the fixed gating time $T_\theta$ the up-counter continues to count at the frequency $f_\theta$ from the content $Za$ which had been set by the address preselector 18 until it reaches a terminal content which is derived according to the following formula:

$$Z_e = Z_a + F_\theta \cdot T$$

After the expiration of the gating interval the up-counter 19 thus contains a certain 5-bit word which, together with the 3 MSB bits from the fixed memory, forms the 8-bit address for the central memory 16. Thus, when the engine is in operational conditions and delivers status signals such as WL, STWL etc., which indicate temperature-dependence, the address also becomes temperature-dependent. If the status signals of the engine indicate a condition which is not temperature-dependent, the counting input to the counter 19 is blocked so that the 8-bit address fed to the central memory 16 by the address preselector 18 is temperature-independent.

Figure 2A:
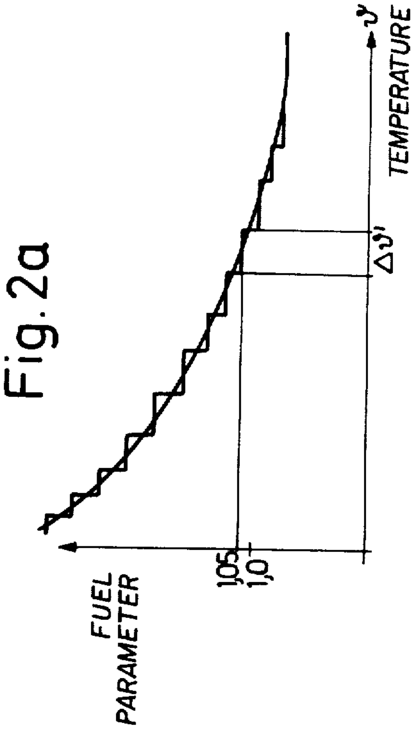
FIG. 2a is a diagram illustrating the fuel enrichment factor as a function of temperature during warm-up operation.

FIG. 2a illustrates how the amount of fuel delivered to the engine increases as a function of decreasing temperature where the abscissa is indicative of temperature while the ordinate indicates fuel quantity. The particular curve corresponding to the engine behavior is known in advance and, if the status signal WL is active, corresponding to warm-up operation, the curve is divided into 32 steps so that the central memory 16 stores 32 words of 8-bit length corresponding to the temperature range of interest during the warm-up of the engine. Depending on the temperature-dependent counter frequency $f_\theta$ received by the counter 19, the 5-bit address portion generated by the counter 19 is used to select one of the 32 words in the central memory 16, namely that word which corresponds to the temperature region $\Delta_\theta$ which is included in the region defined by the word within the memory. The central memory 16 then delivers a datum which, in the particular example illustrated, corresponds to the numerical value 1.05 for the particular range of temperature $\Delta_\theta$.

A further substantial advantage derives from preloading the up-counter 19 with a 5-bit word from the ROM in the address preselector 18. This advantage is based on the fact that the capacity of the counter 19 is 5-bits so that the frequency $f_{74}$ would have to span a dynamic range of 1:32 for a full utilization of the capacity of the counter 19. Such a large dynamic range is impossible to realize in practical applications. By charging the counter 19 with an initial value from the fixed memory or from some other source, the 0 point is suppressed and the partial address formed by supplying the counter frequency $f_\theta$ is expanded over the entire capacity of the memory. For this reason, the ratio between $f_{\theta max}$ and $f_{\theta min}$ need only be as large as the factor 2.

Figure 4:
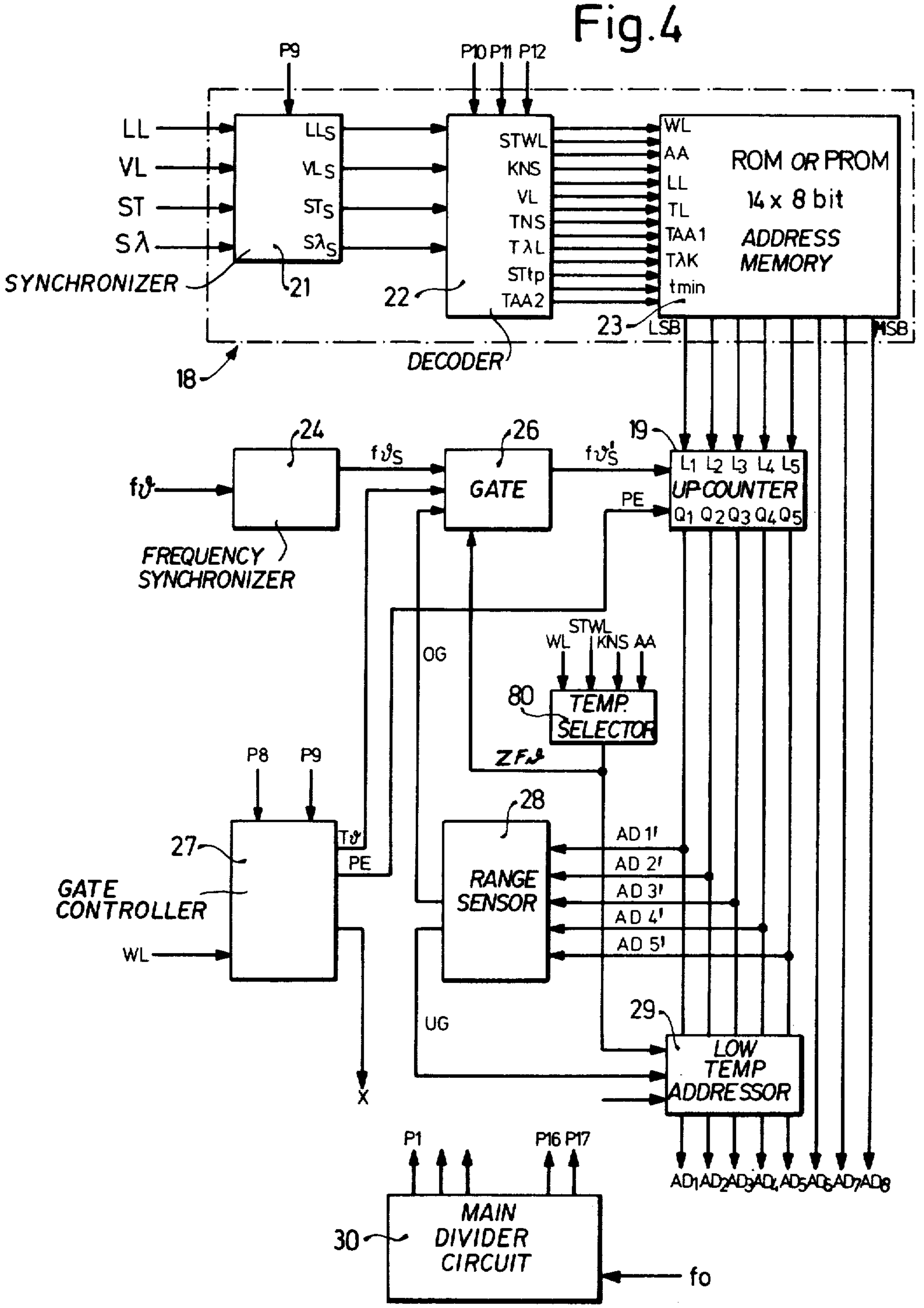
FIG. 4 is a detailed block circuit diagram of the address processor of the present invention.

Turning now to FIG. 4, there will be seen in greater detail the construction of the address preselector circuit 18 which receives the input switching signals LL, VL, ST and Sλ. The circuit 18 includes a synchronizer circuit 21, a subsequent decoder circuit 22 and the previously referred-to fixed value memory 23 which may be a ROM or PROM memory and which has a capacity of 14 times 8-bits. The 14 8-bit words are directly addressed by individual lines from the prior decoder circuit 2 and the output of the fixed memory carries an 8-bit pre-address depending on the cyclically available status symbol WL, STWL etc. As already mentioned, four of the 23 status signals which control the fixed memory, i.e., the words WL, STWL, KNS and AA are temperature-dependent and the initial values delivered by the selector memory 23 to the counter 19 are values which are smaller than the numerical value 31 and thus represent a value which depends on the dynamic range of the oscillator frequency which is then combined with the sum derived from the frequency supplied during the gating period to generate the correct address for the central memory 16. The 5-bit words reaching the counter 19 but related to the remaining status signals which are not to be influenced by the temperature-dependent frequency $f_\theta$ are equal to the values of the final address because they are transmitted by the counter 19 without change. These initial value addresses occupy locations 80 to 89 in the central memory 16 (according to Table I) and if the address count starts at the number 128 they occupy the addresses 208 to 217. An allocation scheme of the address memory 23 is illustrated in the Table II below.

TABLE II

ALLOCATION OF ADDRESS MEMORY

| Word | Content | Initial Address | A8 MSB | A7 | A6 | A5 | A4 | A3 | A2 | A1 LSB |
|---|---|---|---|---|---|---|---|---|---|---|
| 0 | empty | 0 | | | | | | | | |
| 1 | STWL | <31 + 32 fixed | 0 | 0 | 1 | X | X | X | X | X |
| 2 | WL | <31 | 0 | 0 | 0 | X | X | X | X | X |
| 3 | TL | 80 | 0 | 1 | 0 | 1 | 0 | 0 | 0 | 0 |
| 4 | KNS | <31 + 32 fixed | 0 | 0 | 1 | X | X | X | X | X |
| 5 | AA | <31 + 64 fixed | 0 | 1 | 0 | X | X | X | X | X |
| 6 | LL | 81 | 0 | 1 | 0 | 1 | 0 | 0 | 0 | 1 |
| 7 | VL | 82 | 0 | 1 | 0 | 1 | 0 | 0 | 1 | 0 |
| 8 | T λK | 83 | 0 | 1 | 0 | 1 | 0 | 0 | 1 | 1 |
| 9 | T λL | 84 | 0 | 1 | 0 | 1 | 0 | 1 | 0 | 0 |
| 10 | TNS | 85 | 0 | 1 | 0 | 1 | 0 | 1 | 0 | 1 |
| 11 | TAA1 | 86 | 0 | 1 | 0 | 1 | 0 | 1 | 1 | 0 |
| 12 | TAA2 | 87 | 0 | 1 | 0 | 1 | 0 | 1 | 1 | 1 |

TABLE II-continued

| ALLOCATION OF ADDRESS MEMORY | | | | | | | | | | |
|---|---|---|---|---|---|---|---|---|---|---|
| Word | Content | Initial Address | A8 MSB | A7 | A6 | A5 | A4 | A3 | A2 | A1 LSB |
| 13 | STtp | 88 | 0 | 1 | 0 | 1 | 1 | 0 | 0 | 0 |
| 14 | tmin | 89 | 0 | 1 | 0 | 1 | 1 | 0 | 0 | 1 |

X = variable initial address, depending on dynamic range of the temperature-dependent oscillator frequency.

Table II indicates that the 3 MSB of the address memory 23 are used as a fixed address for the choice of the regions 1 to *n* and are delivered directly to the central memory 16, whereas the 5 LSB bits of the address memory 23 are used as a pre-address for the 0 suppression of the counter 19 and are supplied to the jam inputs $L_1$ to $L_5$.

The system of the invention also includes a main divider circuit 30 which uses a basic frequency $f_0$, generated, for example, by a quartz-stabilized oscillator and having a value of, for example, 600 kHz for generating a multitude of sub-frequencies by simple division. These sub-frequencies have a fixed phase relationship and are used to control and force-synchronize the entire cyclic operation of the address processor. The sub-frequencies are labeled $P_1$ to $P_{17}$ and are used at various points of the entire circuit for controlling the temporal processes occurring there. The following Table indicates the frequency allocation for a practical embodiment of the invention.

TABLE III

| FREQUENCY ALLOCATION | |
|---|---|
| P1 | 200 kHz |
| P2 | 100 kHz |
| P3 | 50 kHz |
| P4 | 25 kHz |
| P5 | 12.5 kHz |
| P6 | 6.25 kHz |
| P7 | 3.125 kHz |
| P8 | 1.5625 kHz |
| P9 | 781.25 Hz |
| P10 | 390.625 Hz |
| P11 | 195.3125 Hz |
| P12 | 97.65626 Hz |
| P13 | 48.828125 Hz |
| P14 | 24.4140625 Hz |
| P15 | 12.20703125 Hz |
| P16 | 6.103515625 Hz |
| P17 | 3.0517578125 Hz |

Turning now to FIG. 4, it will be seen that the temperature-dependent pulse train $f_\theta$ whose phase is random is fed, firstly, to a frequency synchronizer unit 24 which transforms it into a synchronized counting frequency $f_{\theta s}$. This may be done, for example, in simple manner by the use of bistable flip-flops triggered by one of the frequencies $P_1$ and $P_6$ wherein the synchronizer unit 24 delivers a pulse whenever a synchronizing pulse as well as an $f_\theta$ pulse are present simultaneously. By appropriate rapid clocking, a forced synchronization is achieved without loss of resolution. The frequency synchronizer unit 24 not only translates the temperature-dependent pulse train $f_\theta$ into a fixed frequency-time frame but also performs a single pulse generation, i.e., a possible pulse to pulse interval ratio of 1:1 of the temperature-dependent pulse train is reduced to the pulse duration of the clock pulse train frequency.

Figure 3:
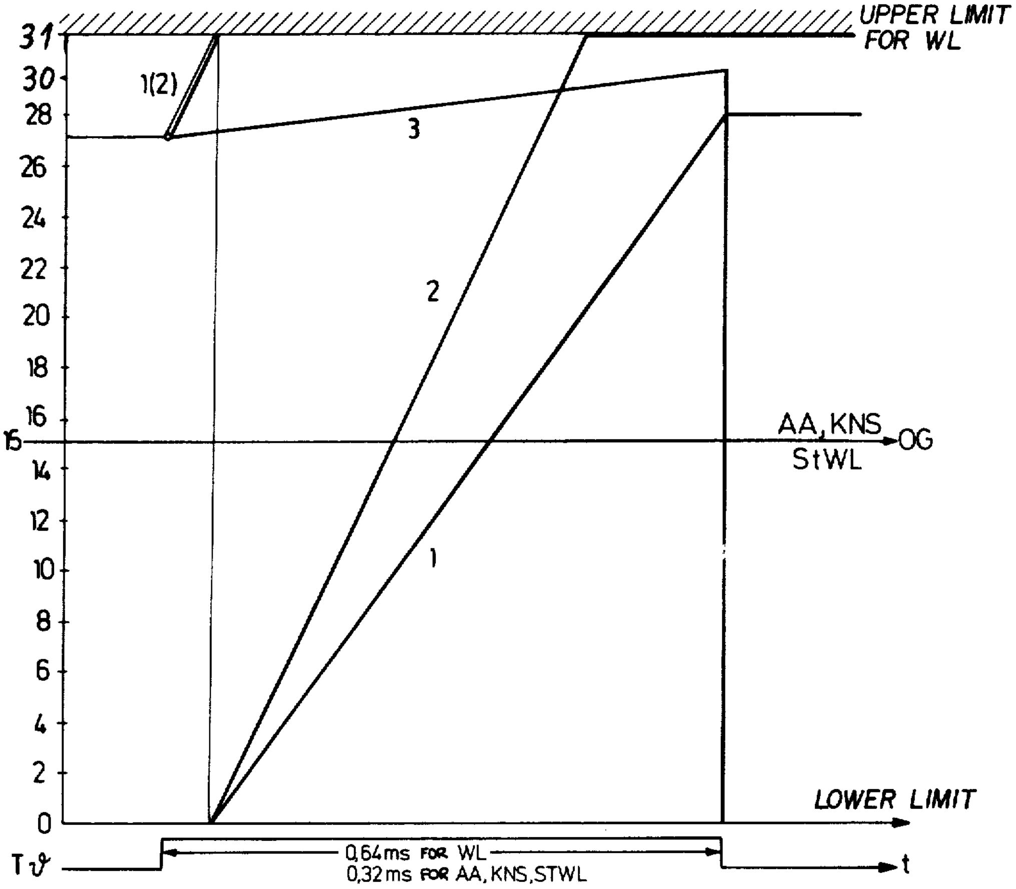
FIG. 3 is a diagram illustrating several possible events which take place during the calculation of the partial address for the central processor.

There is further provided a gate circuit 26 which receives the synchronized temperature-dependent frequency $f_{\theta s}$ and which releases it to the counter 19 if an appropriate control signal is fed to it by a gate control circuit 27. The detailed construction of these circuits is given further below. The gate control circuit receives the clock frequencies $P_8$ and $P_9$ and uses them to generate a gating pulse of duration 0.64 ms (used in the present exemplary embodiment although other values are possible) or a gating time $t_\theta$ of 0.32 ms and feeds these gating periods to the gate circuit 26. The clock frequencies $P_8$ and $P_9$ are used because they have frequencies, respectively, of 1.5625 kHz and 0.78125 kHz which correspond to the desired pulse lengths of 0.64 ms and 1.28 ms. Thus, the gate control circuit 26 permits the frequency $f_{\theta s}$ to reach the counter 19 during a period 0.64 ms and to be added to a fixed initial valve placed in the counter 19 by the address pre-selector memory 23. This initial value is indicated in FIG. 3 and corresponds to the numerical counter content 27. When the counting sequence $f_{\theta s}$ reaches the counter during the open gate period, three separate cases may result and these will now be studied in detail. If the pulse train $f_{\theta s}$ corresponds to a temperature between −30° C to +40° C of the engine, then the counter 19 will be filled up quickly starting with its initial value and will be reset to 0 where it begins to count anew as shown in FIG. 3. In that first case, the temperature-dependent frequency $f_{\theta s}$ corresponds to a normal temperature region so that, within the gating time $T_\theta$, the final content in the counter lies between 0 and the maximum and constitutes the remaining 5-bit LSB address for the central memory 16. This normal case requires no further discussion.

On the other hand, it would be possible for the temperature of the engine to be so high that, after the first permissible overflow of the counter 19 which is recognized by a range sensor circuit 28 which will be described in further detail below, there takes place within the gating time $t_\theta$ a second overflow, i.e., as illustrated for case 2 of FIG. 3. Thus, the counter reaches its maximum content a second time and if it were not prevented from doing so, it would begin to count anew from 0 and would deliver a completely erroneous value as an address at the termination of the gating period. In this case, the range sensor circuit 28 causes the counting process to be interrupted after the second maximum count is reached and to retain that count for delivery to the central memory. On the other hand, it is also possible that the counter frequency corresponding to a low temperature is so low as to constitute the situation depicted in case 3 of FIG. 3., i.e., the counter never reaches even the first overflow condition. In that case, the final content is also incorrect and would be indicative of a very high temperature, i.e., exactly contrary to the prevailing condition. In such a case, the range sensor circuit 28 ignores the outputs $Q_1$ to $Q_5$ of the counter 19 and generates its own address corresponding to the lower limit of temperature. This is done with the aid of a low temperature addressor 29 which is associated with the range sensor circuit 28 and operates at the lower temperature limit.

There are thus the following three separate cases:

Case 1: At the termination of the gating time $T_\theta$, the counter content lies between a lower and an upper limiting value. This counter content is used as an address and transmitted to the main memory 16.

($\theta_{UG} < \theta < \theta_{OG}$).

Case 2: During the gating time, the upper limiting value is reached a second time. In that case, the range sensor circuit 28 blocks the counter and the upper limiting value is used as an address for the central memory 16 ($\theta = \theta_{OG}$).

Case 3: During the gating time, the upper limit is never reached and in that case a low temperature addressor is activated to generate an address corresponding to the lower limiting value of the counter, i.e., all outputs are set to 0 ($\theta = \theta_{UG}$).

It has already been mentioned that the status WL, i.e., the warm-up condition of the engine, requires the most precise set of data and therefore this status commands 32 separate 8-bit words in the central memory 16. Thus, the status WL is permitted a maximum content of 31 in the up-counter 19 while the 3 MSB coming from the pre-addressor 23 define the WL region within the central memory per se. A similarly precise quantization is not required even for other temperature-dependent states which only require 16 words in the central memory so that the counter 19 is required to count only to a maximum content of 15. The counting capacity is reduced to one-half by limiting the gating time $T_\theta$ to half the value it has during the status WL, i.e., in the present exemplary embodiment to 0.32 ms for the states AA, KNS and STWL. The gating time is selected depending on the value of the logical signal WL. When WL is a logical 1, the gating time $T_\theta$ is 0.64 ms in the illustrated exemplary embodiment.

The 14 status signals or operational conditions which are used in the present example, and which are fed as input lines to the address memory 23 of FIG. 4, are generated by the decoder circuit 22 which selects one of 14 output lines. In addition, the choice of these outputs is controlled cyclically, i.e., there is a sequential interrogation with the clock sub-frequencies P10, P11 and P12 which are delivered to the decoder circuit 22. This results in a signal capacity of 3 bits, i.e., eight possible states, and Table IV below indicates the sequence of access to the address memory 23.

TABLE IV

| SEQUENCE OF MEMORY ACCESS | | |
|---|---|---|
| Cycle | Start STs = 1 | No Start STs = 0 |
| T1 | STWL | WL |
| T2 | STtp | TλL, if Sλ = 1 |
| T3 | tmin | tmin |
| T4 | NS | TλK, if Sλ = 1 |
| T5 | AA | AA once |
| T6 | TL | TL, LL, VL |
| T7 | TAA | TAA if Sλ = 0 |
| T8 | TNS | TNS if Sλ = 0 |

These eight possible states, i.e., the cycles T1 to T8 occur in sequence and Table IV indicates the association of the status signals with the eight partial cycles T1 to T8. In the exemplary embodiment, each of these cycles has a length of 1.28 ms (see FIG. 5) so that the repetition frequency for the same cycle is 97.65 Hz and is equal to the sub-frequency P12. During the cycle time of 1.28 ms, one of the 14 possible status signals is activated so that the appropriate address from the address memory 23 causes the setting of the counter 19 with the 5 LSBs and if necessary, for temperature-dependent values, the counter is then supplemented for forming the complete address for the central memory 16. Sufficient time then still remains for the central memory 16 to deliver the datum corresponding to that address to a bus interface circuit 15 (FIG. 1) which delivers it to the corrector circuit 11 for the formation of the correction frequency $f_K$. Thus, the remaining time suffices for generating the address and for a complete data exchange between the central memory 16 and the correction circuit 11.

The cycles T1 to T8 obey the association shown in Table IV throughout the system, thus eight cycles suffice for the cyclic interrogation of the 14 status signals because the engine is either being started or it is in normal operation. Thus, an unequivocal association of the status symbols and the eight cycles T1 to T8 is guaranteed.

The exact construction of the central memory 16 need not be discussed because such memories for storing a multitude of 8-bit words or words of other length are known in the state-of-the-art. The memory receives an address on lines $AD_1$ to $AD_8$ during a certain period of time and the memory has an internal decoder circuit which performs a one-of-256 selection and delivers the chosen stored datum in parallel at its output terminals. It is possible to use any desired type of memory which performs the function of translating an address into an output of a stored datum or binary word.

Figure 5:
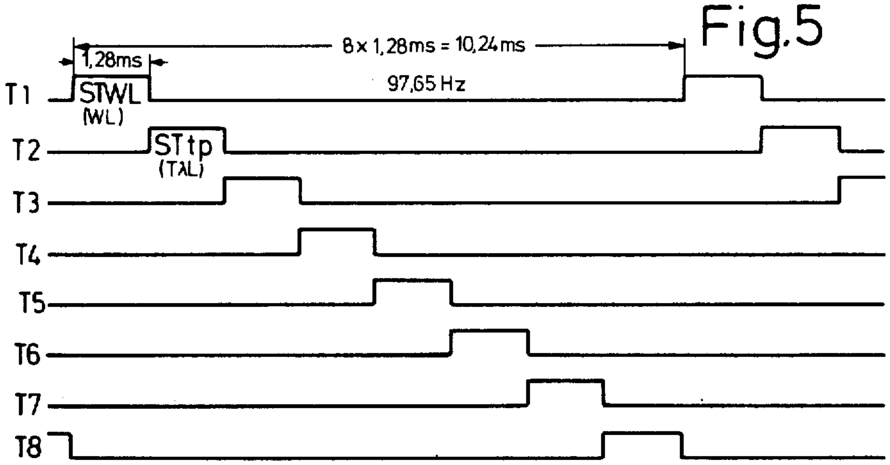
FIG. 5 illustrates the cyclic timing of the access to the address memory for the conditions of starting and non-starting.

FIG. 5 is a timing diagram illustrating the access to the address pre-selector memory 23. In what follows, the individual circuits shown in FIG. 4 will be discussed in more detail and their cooperation for performing the previously discussed functions will also be treated.

Figure 6:
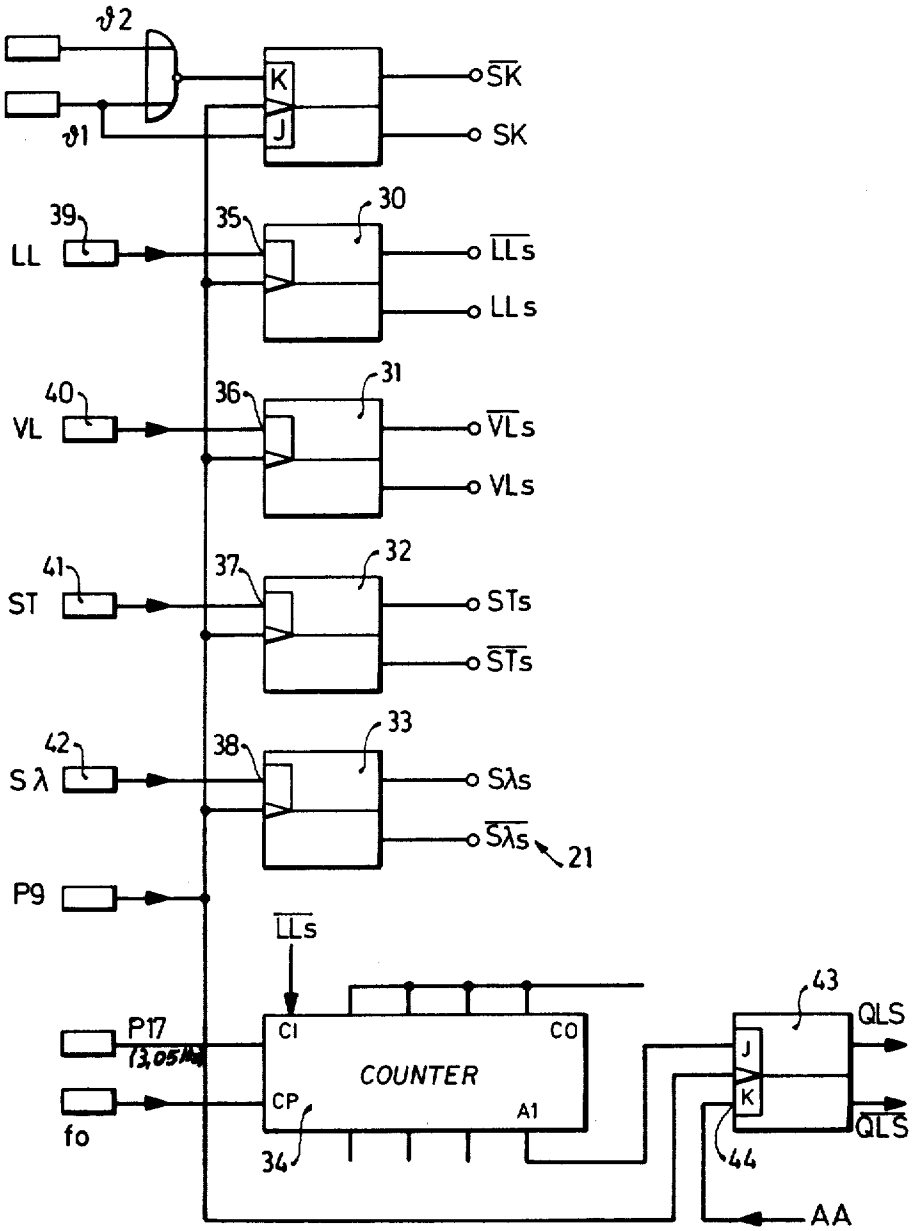
FIG. 6 is a detailed block diagram of the synchronizer circuit in FIG. 4.

FIG. 6 is a detailed diagram of the synchronizer circuit 21. In the present exemplary embodiment, that circuit includes 4 bistable multivibrators 30, 31, 32, 33 as well as a counter 34 whose function and purpose will be explained below. The bistable multivibrators are preferably so-called "D" flip-flops, for example those marketed by the firm RCA under the type number 4013. Such flip-flops are so designed that, at certain times, i.e., under forced synchronization, signals present at the inputs 35 to 38 are transferred to the outputs. The times during which the transfer occurs are defined by the pulse sequence P9 which is connected to the synchronizing inputs of the flip-flops 30 to 33. This prevents the possibility that a particular input signal switches logical states during the occurrence of one of the clock cycles T1 to T8. The clock sequence P9 insures that the output of the flip-flops 30 to 33 retains that logical state during the entire period of a P9 cycle which was present at the beginning of that cycle. The input signals to the flip-flops 30 to 33 are the logical signals LL, VL, ST and Sλ, already seen in FIG. 4, which may be generated as analog signals by appropriate switches or contacts designated with the numerals 39 to 42. It will be observed that the clock pulse sequence P9 has a force-synchronizing effect since an idling signal coming from the switch 39, for example, will be accepted by the flip-flop 30 as a synchronized idling signal $LL_s$ only if, at the same time, the clock pulse sequence P9 exhibits the state of a logical 1. This logical state is then maintained by the flip-flop during the timing interval of P9 even if the logical signal LL at the input of the flip-flop 30 were to revert to its other state. FIG. 6 shows that the outputs of the flip-flops 30 to 33 carry the synchronized switching signals and their complements. All of the pulse trains P1 to P17 are suitably rectangular pulses with a keying ratio of one-half. By connecting the pulse sequence P9 to each of the flip-flops 30 to 33, these flip-flops transmit the input signals coming from the switches 39 to 42 and introduce them into the synchronous time frame of the entire system.

FIG. 6 also shows a counter 34 which will be designated an idling counter and may be, for example, an integrated circuit of the type 4029 marketed by RCA. In order to improve the understanding and construction of this counter, the following conditions will now be explained. In the access scheme to the memory, and during the cycling period T5, there is provided a vehicle run-up enrichment AA which delivers to the engine an enriched fuel-air mixture whenever the engine is accelerated from idling. This action prevents stalling the engine during the initiation of vehicle motion. Basically, the order for starting enrichment could be provided by the idling signal LL but that signal also occurs if the operator of the vehicle changes gears or for some other reason and having nothing to do with vehicle motion but causing the gas pedal to return to idle. In that case, the central system of the electronic fuel injection system would produce a richer mixture during each gear change and result in unduly enriched fuel-air mixtures. To prevent this occurrence, the counter 34 is provided. A basic assumption will be that any gear change would require less than approximately 2 to 3 seconds, i.e., any gear change during which the idling signal LL appears would be terminated after 2 seconds. Thus, if the LL signal still occurs after a predetermined time period, in the exemplary embodiment a time period of 2.62 seconds, then the conditions are assumed to be a true initiation of motion and the engine will thus be assumed to require the run-up enrichment AA. To perform this decision, the idling counter 34 is a 3-bit counter in the present example and receives the counting sub-frequency P17 equal to 3.05 Hz. Thus, after 2.62 seconds have elapsed the output $A_1$ of the idling counter 34 exhibits a logical 1 and places the subsequent bistable flip-flop 43 into one of its states. This state is interrogated at the time T5 and is used for run-up enrichment. The flip-flop 43 is also force-synchronized by receiving the sub-frequency P9 and also has a reset input which receives the AA signal itself so as to be resettable to its initial state and to prevent a run-up enrichment every time it is interrogated at the time T5. The counter 34 is released by the idling signal $\overline{LL}_s$ or its complement $\overline{LL}_s$ so that the entire process takes place only if at least the idling signal LL is present.

Figure 7:
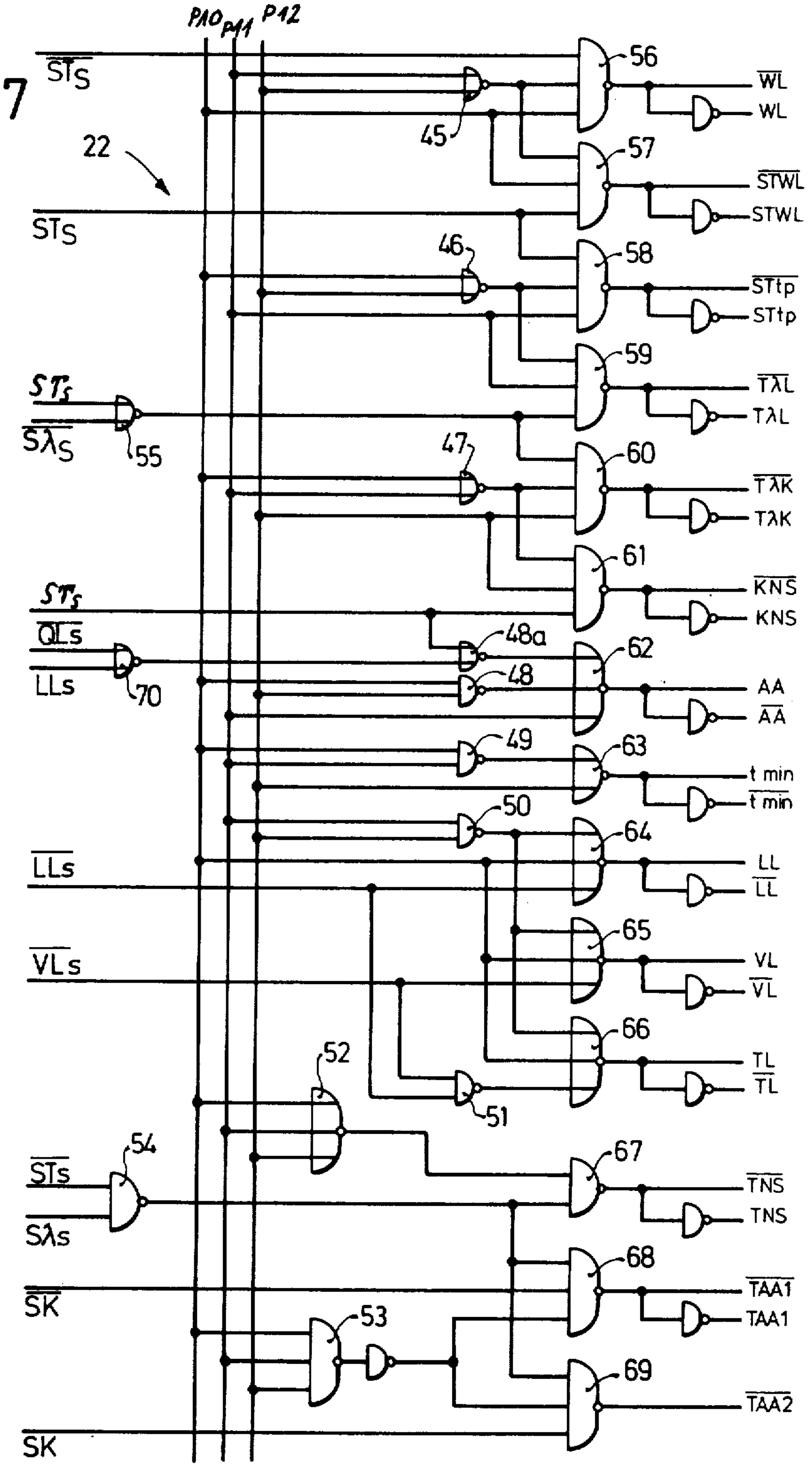
FIG. 7 is a detailed illustration of the decoder circuit of FIG. 4.

FIG. 7 illustrates one possible embodiment of the decoder circuit 22 of FIG. 4. The decoder circuit 22 uses the information present in this case in the form of 4 synchronized signals which are present in cyclic sequence corresponding to the cycling pulses T1 to T8 and generates the status signals fed to the address memory 23 depending also on whether the engine is being started or not. Actually, the specific construction of the logical connection circuitry which operates as a decoder 22 is somewhat arbitrary, the only pre-requisite being to achieve the desired function. The exemplary embodiment illustrated in FIG. 7 is one way of coupling the clock frequencies P10, P11, and P12 with control signals derived from the operational behavior of the engine and thus to derive the signal sequence corresponding to the cycles T1 to T8 and to form the 14 status signals.

Since, in principle, the number, type and kind of status signals is arbitrary, the representation of FIG. 7 relates only to a special exemplary embodiment. However, when the status signals have once been designated with respect to type and formation, the same circuit may be used for all engines. Any adaptation to other engines would take place by changing the contents of the main memory. Thus, it is possible to take a particular and fixed exemplary embodiment of the invention and to embody it as an integrated circuit in an LSI-chip which would make subsequent changes impractical. The universal adaptability of the circuit according to the invention makes it possible to dispense with a detailed discussion of the various signal trains deriving from the circuit. Any person skilled in the art is able to refer to the various AND, NOR and NAND gates 45 to 70 in FIG. 7 and to derive therefrom the association with the operational signals as well as the timing sequence of the status signals. Furthermore, the generation of the static analog input signals LL, VL, ST and Sλ also depends on the engine types, for example the idling signal LL as well as the full-load signal VL are often produced by establishing a contact to ground so as to produce a logical 0 signal. One special condition of the decoder circuit 22 should be mentioned separately, namely that the run-up enrichment AA should and can be triggered only if the idling condition has been definitely established beforehand which is recognizable from the switching state of the flip-flop 43, already described with respect to FIG. 6, whose output signal $\overline{QL}_s$ is fed to a NOR gate 17. The other input of the NOR gate receives an $LL_s$ signal. When the $LL_s$ signal is a logical 0, the idling condition is no longer present. Thus, the output of the NOR gate 17 provides the condition that there has been an idling condition and was correctly recognized, i.e., that it endured longer than the 2.62 seconds of the present example and corresponding to the static output signal $\overline{QL}_s$ of the flip-flop 43 and that an idling condition no longer obtains (corresponding to the $LL_s$ signal). Only then is the AA output signal generated in the cyclically predetermined time, i.e., at the clock time T5. At the same time the flip-flop 43 is reset, as already mentioned, so that the $\overline{QL}_s$ signal disappears and no enrichment takes place at the next interrogation at the subsequent time T5. The other coupling circuits of FIG. 7 operate in similar manner, the input signal $ST_s$ of the decoder circuit 22 being particularly significant because, according to the contents of Table IV, this starting signal $ST_s$ is responsible for dividing the total of 14 output status signals over the eight cycling times T1 to T8.

Figure 8:
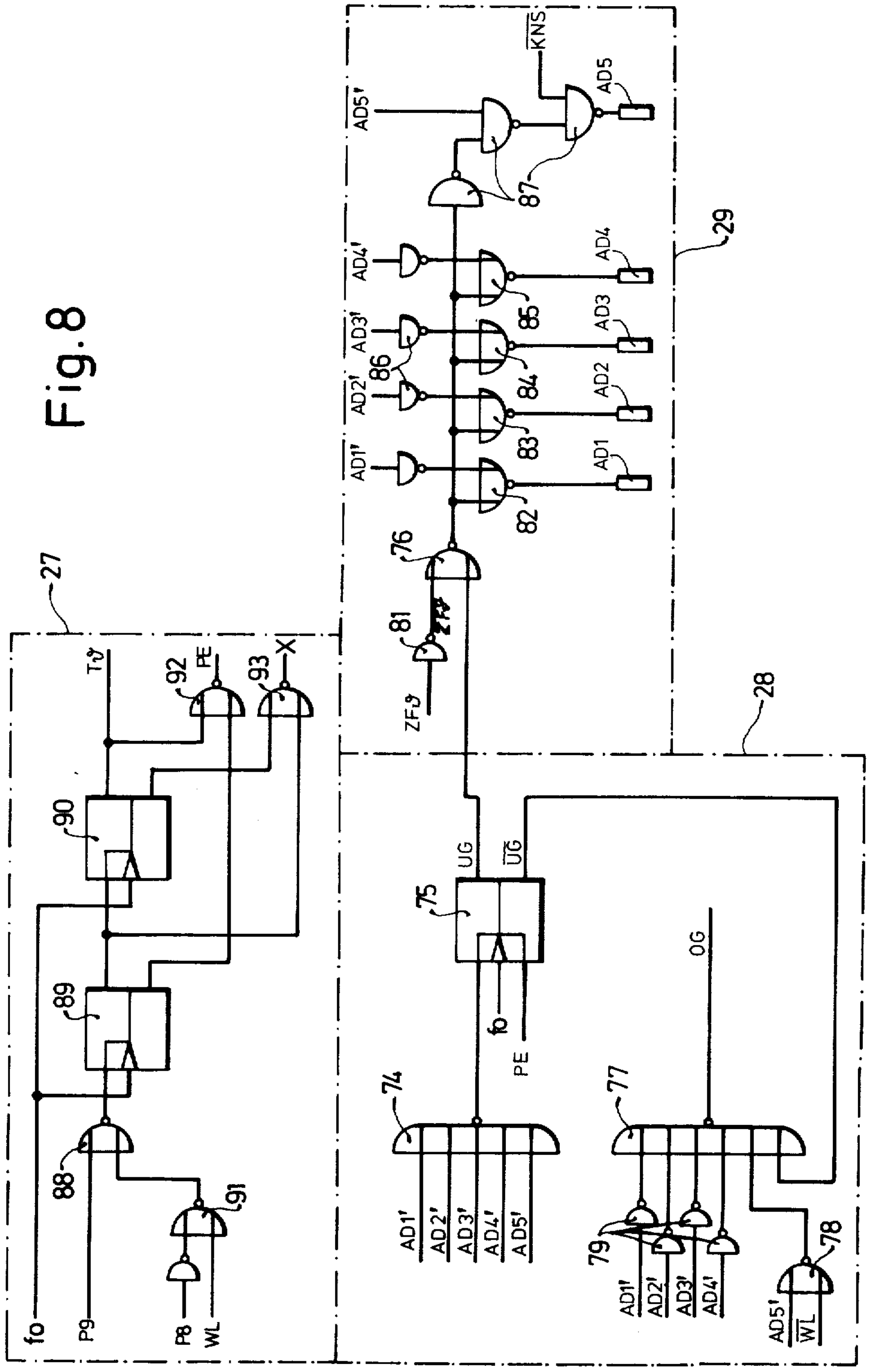
FIG. 8 is a detailed illustration of the range selector circuit of FIG. 4.

FIG. 8 illustrates the blocks 27, 28 and 29 in greater detail and they will now be discussed with the aid of the various possible counter conditions illustrated in FIG. 3. As has already been discussed, the up-counter 19 must be permitted to overflow at least once so that, in the normal case 1, the final counter content will be between 0 and 31 for the status WL or between 0 and 15 for the conditions AA, KNS or STWL. If the counter does not overflow at all, then the address portion supplied by the counter will be equal to the lowest temperature and will be transmitted via lines AD1 to AD5 which will carry a logical 0 for transmission to the central memory 16, (corresponding to the case 3 of FIG. 3).

If the counter attempts to overflow a second time, the partial address formed by the 5 LSBs will be made a logical 1 and will correspond to the highest designed temperature.

These decisions are made by the range sensing circuit 28 which senses the signals AD1' to AD5' present at the outputs Q1 to Q5 of the counter 19. It includes a NOR gate 74 which responds to the first overflow of the counter 19 and produces a logical 1 if the outputs Q1 to Q5 of the counter 19 are identically 0. Subsequent to the NOR gate 74 is connected a bistable flip-flop 75 which is set into one of its states by the logical 1 from the NOR gate 74 thereby producing its own output a signal UG which is fed to a NOR gate 76 of the address switcher 29 as will be explained below.

The range sensing circuit 28 has a further NOR gate 77 which also receives the output signals AD1' to AD4' of the counter 19 as well as the output signal AD5' which, however, first travels through a supplementary NOR gate 78. The NOR gate 77 also receives the output signal $\overline{UG}$ of the flip-flop 75 which prevents the NOR gate 77 to respond at the first overflow of the counter 19. The circuit which recognizes the second overflow of the counter 19 (corresponding to Case 2 of FIG. 3) is so constructed that a signal OG (a logical 1) is generated when the first overflow of the NOR gate 74 has been sensed and the flip-flop 75 has been set. The input signals AD1' to AD4' are fed to the NOR gate 77 via inverter 79 as is the signal AD5' which comes via NOR gate 78. If all of the inputs of the NOR gate 77 show a logical 0, the gate produces the signal OG and, as seen in FIG. 4, feeds it to the gate circuit 26 which interrupts the counting process of the counter 19 and holds the contents of the counter at the logical state 1 in all locations which corresponds to the maximum planned temperature. The purpose of bringing in the signal AD5' via NOR gate 78 which also receives the signal $\overline{WL}$ (corresponding to the status signal "not WL") has the sole purpose of admitting the counter content 31 as the upper limit for the WL status signal if the OG signal was already produced at the counter content 15 without the presence of a status signal WL.

The illustration of FIG. 4 includes a block 80 which produces an output signal $ZF_\theta$ during the presence of one of the operational states WL, STWL, NS or AA, i.e., if, in general, a temperature-dependent address is to be calculated. In that case, the signal $ZF_\theta$ is a logical 1 and flows through a NAND gate 81 (see FIG. 8) belonging to the low temperature addressor 29 to the subsequent NOR gate 76. This is done for the following reason. If there are no temperature-dependent states or status signals, the input of the counter 19 must be transmitted without change to its output without interference by the range sensor circuit 28. However, if the flip-flop 75 has not yet registered a first overflow and has therefore not been set, the range sensor circuit holds the outputs AD1 to AD5 at a logical 0 via the NOR gate 76 due to the absence of the signal UG, i.e., the output of the NOR gate 76 blocks in this case the subsequent NOR gates 82, 83, 84 and 85 as well as a further coupling circuit 87 leading to the output AD5 so that the outputs AD1 to AD5 all show a logical 0. However, this is permitted only if a temperature-dependent address is to be calculated, i.e., if the signal $ZF_\theta$ is at the same time a logical 1 or if $\overline{ZF}_\theta$ is a logical 0. In this case, and for temperature-dependent addresses, one input of the NOR gate 76 sees the signal $\overline{ZF}_\theta = 0$ and the other the signal UG = 0 so that the output of the NOR gate 76 is a logical 1 and, as will be easily seen, the outputs of the NOR gates 82 to 85 are locked into the value logical 0 independently of the logical state present at the other input of the NOR gates 82 to 85. Thus, the conditions previously explained in detail with respect to Case 3 are achieved. On the other hand, as already mentioned, this state should not occur if the address generation is not, in fact, temperature-dependent. In that case, the range sensor circuit should not block the outputs AD1 to AD5 at logical 0 corresponding to the lower limit. If the signal $ZF_\theta$ is absent, and thus $\overline{ZF}_\theta$ is 1, then, prior to the switch-over of the flip-flop 75 (corresponding to a signal UG = 0), the output of the NOR gate 76 always has a logical 0 so that any signals coming from the counter 19 are permitted to pass through unchanged. This is possible because the signals AD1' to AD5' reach the other inputs of the NOR gates 82 to 85 via inverters 86.

The transport and switching of the AD5' signal is performed by a coupling circuit 87 including three NAND gates which also receives the negated signal $\overline{KNS}$. Let it be assumed for clarity that the signal AD5' which occurs at the output Q5 of the counter 19 is processed in the same way as the signals AD1' to AD4', then the coupling by NAND gates is required because it may not be assumed in advance for all address regions that the lower limit in all locations is 0. However, this is not important for the overall consideration of the present address processor and is mentioned only supplementarily.

FIG. 8 finally also includes the gate controller circuit 27 which includes a NOR gate 88 ahead of two bistable flip-flops 89 and 90. One of the inputs of the NOR gate 88 receives the system clock pulse train P9 whereas the other input of the NOR gate 88 is connected to the output of a further NOR gate 91 whose one input receives a signal WL and whose other input receives the inverted system clock pulse train P8 whose inversion takes place via a NOR gate 92. Both flip-flops 89 and 90 also receive the highest system clock rate $f_0$ for the purposes of synchronizing the switching states. By coupling of the two clock rates P9 and P8, while considering the signal WL, the output of the flip-flop 90, which may be a "D" flip-flop just as was the flip-flop 89, produces the gating time $T_\theta$, whose duration is either 0.64 ms or, if no warm-up conditions prevail, 0.32 ms. As will be seen in FIG. 4, this gating signal $T_\theta$ is fed to the gating circuit 26 which will be mentioned again in connection with FIG. 9. A subsequent NOR gate 92 uses the front edge of the gating signal $T_\theta$ to form therefrom a single preset enable pulse PE. The pulse PE is delivered to the counter 19 (see FIG. 4) and insures that the counter accepts the partial address from the address memory 23 consisting of the first five LSBs present at its inputs $L_1$ to $L_5$ and subsequently counts from that number at the rate $F_{\theta s}$.

The switching states of the "D" flip-flops 89 and 90 are then utilized to generate a signal X, a so-called request signal which will be a logical 1 at the expiration of the gating time $T_\theta$. For this purpose, a further NOR gate 93 receives one output of the flip-flop 89 and the other output of the flip-flop 90. The request signal X is not used within the address processor but serves the purpose of informing subsequent systems, especially the central memory 16, that the address has been calculated and is ready for transfer.

Figure 9:
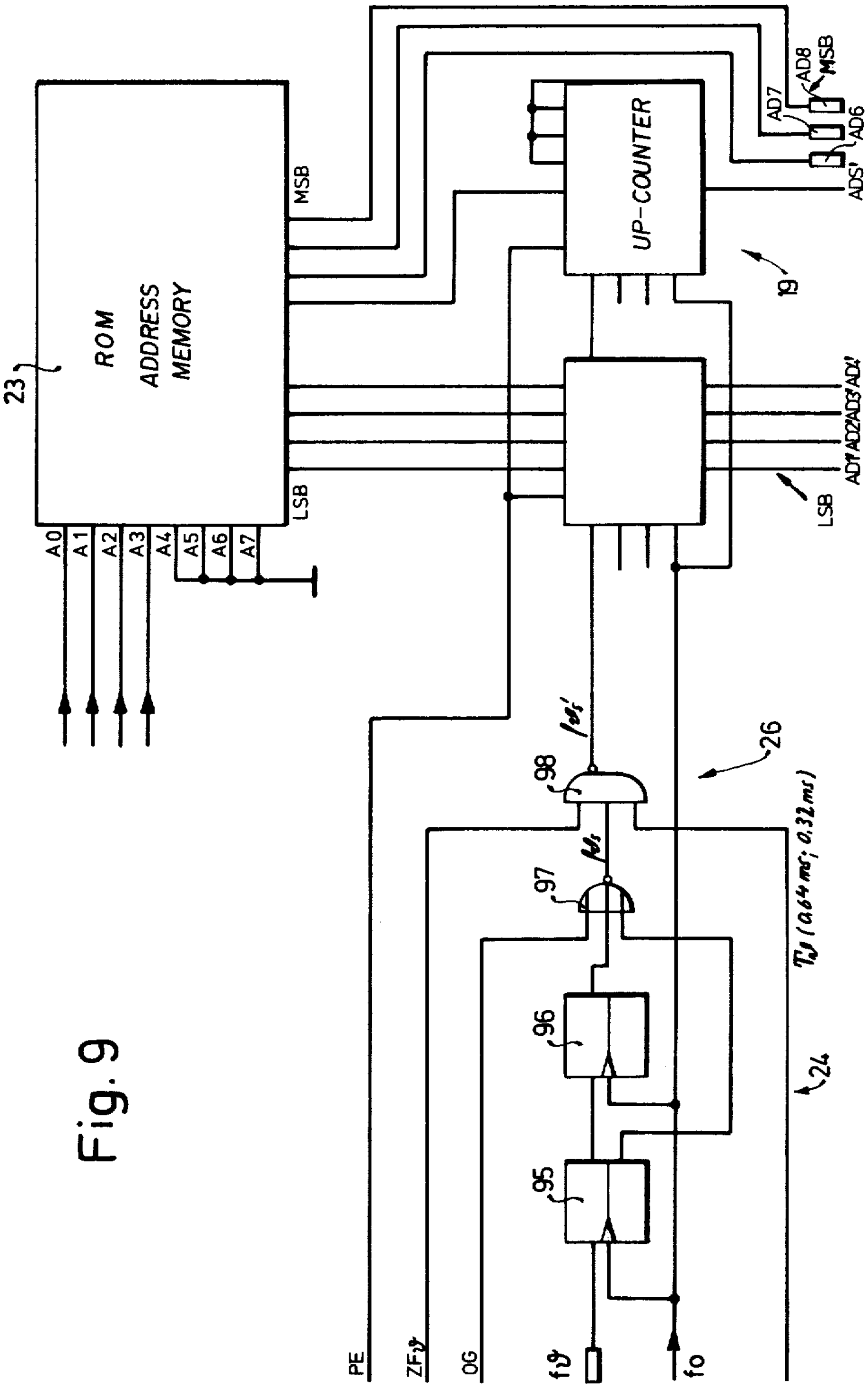
FIG. 9 is a detailed diagram of the counter and the associated gating circuitry of FIG. 4.

FIG. 9 illustrates in more detail the synchronizing circuit 24 and the gate circuit 26. The synchronizing circuit 24 includes a first flip-flop 95, again embodied as a "D" type flip-flop, which receives the basic clock frequency $f_0$ as well as the still free-running temperature-related frequency $f_\theta$. The output of the flip-flop 95 is connected to the input of a subsequent flip-flop 96 whose output is finally connected to the input of a NOR gate 97. This NOR gate 97 is also part of the gating circuit 26 because one of its other inputs receives the signal OG coming from the output of the NOR gate 77 in FIG. 8, related to the recognition of the second overflow of the counter 19. It may be observed that, when the signal OG is a logical 1, the NOR gate 97 is blocked and its output will be exclusively 0 independently of any conditions at the other two inputs. In this manner, the passage of the temperature-dependent frequency $f_\theta$, to the counter 19 is reliably interrupted if the counter reaches the maximum value a second time, corresponding to Case 2 in the illustration of FIG. 3. The output of the NOR gate 97 is connected with a NAND gate 98 which constitutes the main component of the gating circuit 26. The other two inputs of the NAND gate 98 receive, firstly, the above-mentioned signal $ZF_\theta$ which, when equal to a logical 1, indicates a temperature-dependent address. The third input of the NAND gate 98 receives the gating signal $T_\theta$. If all of the input signals of the NAND gate 98 exhibit a logical 0, its output is a logical 1 and when the logical state at the central connection of the gate 98, i.e., the one receiving the frequency $f_{\theta s}$, changes, the output of the NAND gate 98 also changes and this output is connected to the counting input of the subsequent counter 19. In the exemplary embodiment shown, the counter consists of two sequential four-stage binary counters of known construction which need not be discussed in detail; these counters may be, for example, the RCA counter type 4029. The preset enable inputs of both counters receive the above-mentioned signal PE.

The preselect address memory 23 shown in FIG. 9 also includes the decoder circuit 22 which, in many practical examples of this circuit, is an integral constituent of such memories. The address memory 23 and the decoding circuit 22 may be, for example, the PROM memory MF 1702 made by the firm Intel.

Figure 10:
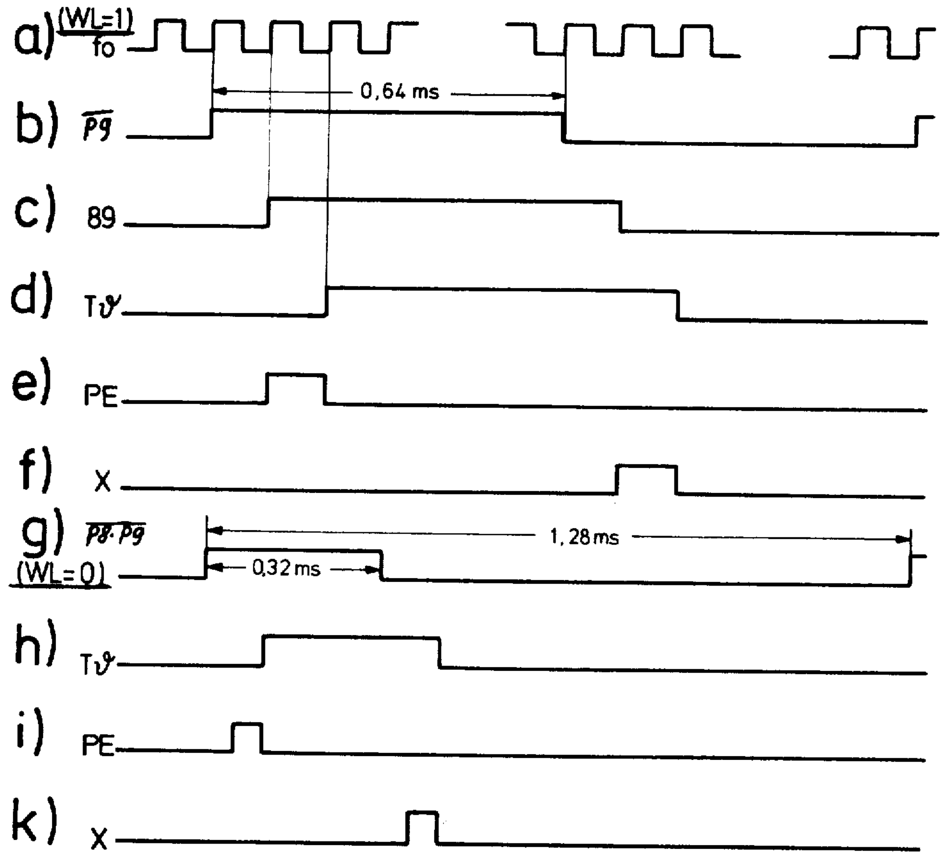
FIG. 10 is a timing diagram for illustration of the operation of a control circuit in FIG. 4.

FIG. 10 is a timing diagram which illustrates the generation of a gating pulse $T_\theta$, the signal PE and the request signal X with the aid of which the gate control circuit 27 will now be discussed briefly. The trace 10*a* shows the basic clock frequency $f_0$ which is used for synchronization and for triggering the "D" flip-flops 89 and 90 in parallel. Considering first the case of an operational status WL, i.e., the WL signal has the value 1. In that case, the output of the OR gate 91 is always 0 and the only clock frequency to be considered is P9 which, when observed behind the NOR gate 88, has the appearance illustrated in the trace 10*b*. By inverting the frequency of P9 as given in Table III, it may be seen that the period for this pulse train is 1.28 ms so that the duration of the signal state logical 1 at this frequency is 0.64 ms. The frequency P9 is fed to an input of the flip-flop 89 which, as may be seen in FIG. 10*c*, changes states again at the arrival of the front edge of the next clock pulse $f_0$. The following front edge of the clock pulse then also flips the subsequent flip-flop 90 into its other state and thus produces the pulse signal for the gating time $T_\theta$. The inverted output of the flip-flop 89 and the non-inverted output of the flip-flop 90 are fed to the NOR gate 92 so that the PE signal of FIG. 10*e* is the difference of the pulse trains of FIG. 10*c* and FIG. 10*d*. In similar manner and as not further explained in detail, the request pulse X illustrated in FIG. 10*f* is generated by means of the non-inverted output of the flip-flop 89 and of the inverted output of the flip-flop 90.

When the status signal WL is 0, the switching states are derivable in similar manner. In that case, the presence of the NAND gate 92 causes the output of the NOR gate 91 to display the normal clock pulse sequence P8 which, together with the sequence P9, reaches the NOR gate 88 so that, after appropriate inversion, there is generated the pulse sequence shown in FIG. 10*g* which remains in a logical state 1 for the time of 0.32 ms. The other pulse durations are given by the curves in FIGS. 10*c*, *d*, *e* and *f* and may be derived from the curves 10*h* for the gating time $T_\theta$, 10*i* for the PE pulse and 10*k* for the request pulse X.

It should also be pointed out that the exemplary embodiment in its special configuration has illustrated considerable detail for the purpose of improving the comprehension of the apparatus and the construction of the system, its operation and the various status signals. It should be understood, however, that, depending on the type and construction of the coupling circuits, especially that of the decoder 22, other operational states may be monitored and controlled and that the various input variables to the system according to the invention could be different.

Finally, it will be observed that a circuit as described above is especially well suited for large scale integration (LSI), particularly because the technological principles employed in its construction are easily integrated on an LSI-chip.

The foregoing relates to a preferred embodiment of the invention, it being understood that other embodiments and variants thereof are possible within the spirit and scope of the invention, the latter being defined by the appended claims.

What is claimed is:

1. A method for addressing a central memory for interrogation thereof and retrieval of data stored therein, said addressing taking place in dependence on the operational states of a system which is itself controlled by the data in said central memory, at least one of said operational states being dependent on another state, preferably the temperature of the system, and in particular adapted to controlling an electronic fuel injection system for generating a correction frequency by using the data retrieved from said central memory, for processing by a main processor and for generation of injection pulses to control the opening times of fuel injection valves of the engine, the improvement comprising:

deriving switching signals from prevailing operational states of the system and feeding said switching signals to a decoder circuit, cyclically activating said decoder for generating a single pre-address selector signal corresponding to each combination of operational states, said pre-address selector signal being fed to an address memory for generating a digital address, a first part of which is fed directly to said main processor for selecting an address range and a second portion of which being fed to a counter which is thereby set to an initial value, gating said counter for a predetermined length of time, feeding to said counter a clock pulse train dependent on said operational state of the system, thereby causing said counter to count upwardly from its initial value, and delivering the final contents of said counter at the expiration of said gating time to said central memory for providing the complete address therein, and closing the gating input to said counter if a particular combination of operational states is independent of said other operational state.

2. In an apparatus for addressing a central memory for interrogation thereof and retrieval of data stored therein, said addressing taking place in dependence on the operational states of a system which is itself controlled by the data in said central memory, at least one of said operational states being dependent on another state, preferably the temperature of the system, and in particular adapted to controlling an electronic fuel injection system for generating a correction frequency by using the data retrieved from said central memory, for processing by a main processor and for generation of injection pulses to control the opening times of fuel injection valves of the engine, the improvement comprising:

means for sensing operational states of the controlled system, means for generating switching signals from said sensed states, decoder means for receiving said switching signals and for generating a plurality of single signals activated in cyclic manner for delivery to an address memory containing address data, the output of said address memory being divided into a first portion and a second portion, said first portion being fed to a central memory and said second portion being fed to a counter for initialization of the contents thereof, means for generating a temperature-dependent frequency and gating means for admitting said temperature-dependent frequency to said counter for continuous counting from said initialized count; whereby, when the gating means have terminated the gating process, said counter contains a number for delivery to said central memory to form together with said first portion an address for delivery of a datum associated therewith in said central memory.

3. An apparatus as defined by claim 2, wherein said means for generating a temperature-dependent frequency is a temperature-dependent element located in the vicinity of the coolant of the engine and an oscillator connected to said element, sensitive to changes of resistance in said temperature-dependent element, thereby producing an output train whose frequency is temperature - proportional and wherein said second portion of said output from said address memory is the five least significant data bits which are delivered to said counter as an initializing content.

4. An apparatus as defined by claim 3, further comprising a synchronizing circuit for receiving said temperature-dependent frequency train, the output of said synchronizing circuit being connected to a gating circuit for gating said counter.

5. An apparatus as defined by claim 2, further comprising a main divider circuit and means for feeding to said main divider circuit a master clock frequency, said main divider circuit serving to generate a multitude of mutually synchronized sub-frequencies.

6. An apparatus as defined by claim 4, further comprising gate control circuitry for generating a variable gate control pulse fed to said gating circuit and for generating a further control pulse fed to said counter for causing the latter to accept the partial address constituted by said second portion from its respective input terminals.

7. An apparatus as defined by claim 2, further comprising range sensor means for altering the output from said counter in dependence on temperature, said range sensor means receiving at its input the output data from said counter, said range sensor means forming a binary word corresponding to the lowest temperature and being equal to a logical 0 on all of its outputs when, at the termination of said gating interval, said counter has not reached its maximum count, and for transferring without change the output of said counter when said counter has exceeded its maximum capacity once after the expiration of said gating time and for generating a binary output word corresponding to the maximum temperature of the installation when said counter has reached its maximum capacity twice after the expiration of said gating time.

8. An apparatus as defined by claim 7, wherein said range sensing means is so embodied that when the content of said counter has reached its maximum capacity twice at the expiration of said gating time, said range sensing means delivers to said gate circuit a signal causing said counter to remain at its maximum count.

9. An apparatus as defined by claim 2, wherein said address memory includes a plurality of storage locations each having 8-bits capacity, wherein when said decoder circuit selects a particular input line, said address memory delivers at its output an 8-bit word, the three most significant bits of which constitute the pre-address of said central memory which is delivered directly to said central memory whereas the remaining five least significant bits are fed to the pre-set inputs of said counter, said counter being a 5-bit counter which counts upwardly at a clock frequency provided by said temperature-dependent pulse train during a time defined by said gating circuit.

10. An apparatus as defined by claim 2, further comprising gate controller means for providing two distinct gating periods to said gating circuit; whereby, during operational conditions substantially influenced by temperature, said counter receives a gating period utilizing its maximum capacity whereas during other operational conditions also dependent on temperature said counter receives a gating period limiting it to one-half of its total capacity.

11. An apparatus as defined by claim 2, wherein said sensor means for sensing operational conditions of the engine include switch means and exhaust gas sensor means for generating said signals fed to said decoder, and further comprising synchronizing means connected ahead of said decoder for placing said signals in a mutually fixed synchronized time frame.

12. An apparatus as defined by claim 11, wherein said synchronizing means includes bistable flip-flops for receiving said signals from said switches and sensors and being clocked by one of said sub-frequencies whereby the outputs of said bistable flip-flops generate mutually synchronized signals relating to the operational conditions of the installation.

13. An apparatus as defined by claim 2, further comprising a 3-bit counter serving as an idling counter receiving a counting pulse train of low frequency connected to a flip-flop which is set by the output of said idling counter when an appropriate idling gate signal releases said idling counter for counting.

14. An apparatus as defined by claim 13, wherein the output from said flip-flop controlled by said idling counter is fed to said decoder circuit if simultaneously an idling signal has become extinct due to an increase of engine speed wherein said flip-flop is resettable to its normal state by an operational signal related to start-up fuel enrichment.

15. An apparatus as defined by claim 2, wherein said decoder circuit receives a plurality of coupled clock frequencies, thereby generating a cyclic activation scheme and wherein specific clock times related to said cyclic activation are delivered to logical coupling circuits which also receive said switching signals.

16. An apparatus as defined by claim 2, further comprising gate control circuitry for controlling said gating circuit, said gate control circuit including bistable flip-flops clocked by a master frequency, and further comprising a NOR gate feeding a first one of said flip-flops, said NOR gate receiving at one of its inputs a first sub-frequency and receiving at its second input another pulse frequency and wherein the output of said first flip-flop is connected to the input of said second flip-flop the output of which generates a signal defining the gating time of said counter.

17. An apparatus as defined by claim 16, wherein said gate control circuit includes a second NOR gate the output of which is connected to said first NOR gate and the input of which receives a signal defining an operational state requiring high precision and the other input of which receiving from an inverter a sub-frequency correlated with the sub-frequency fed to said first NOR gate.

18. An apparatus as defined by claim 17, wherein said gate control circuit includes third and fourth NOR gates receiving alternatively the outputs from said first and second flip-flops for generating a signal for conditioning said counter to receive an initialized content from said address memory and for generating a request signal indicating when the outputs of said addressing apparatus carries said address.

19. An apparatus as defined by claim 18, further comprising range sensor means for determining the number of times said counter has reached its maximum content during said gating period, said range sensing means including a first NOR gate for receiving in parallel the output from said counter, a flip-flop connected behind said first NOR gate and resettable by said pulse from said gate control circuit, the output of said flip-flop defining the operational state of means for altering the address from said counter.

20. An apparatus as defined by claim 19, wherein said range sensing circuit includes a second NOR gate which receives the output signals from said counter after passage through inverters and also receives the inverted output signal of said flip-flop connected behind said first NOR gate; whereby, when the counter content reaches the maximum capacity a second time, a signal is generated which causes said gate circuit to interrupt delivery of the pulse train fed to said counter.

21. An apparatus as defined by claim 20, including another NOR gate receiving at one of its inputs a signal related to an operational state of the installation, the output of which is connected to one of the inputs of said second NOR gate for determining the upper limit of said counter.

22. An apparatus as defined by claim 2, further comprising pulse generator circuit means for receiving input signals related to operational states of the engine all of which are temperature-dependent and for generating an output signal when one of said input signals is selected during the cyclic operation of said decoder circuit for the purpose of calculating an address related to one of said operational states.

23. An apparatus as defined by claim 22, wherein the output signal from said pulse generator circuit and the output signal of said range sensing circuit are fed to a NOR gate within an address change circuit, the output of which so controls subsequent NOR gates that the output of said counter is changed when it has not reached its maximum count at the expiration of said gating period and wherein said address change circuit includes logical circuitry which uses the signal from said pulse generator circuit to prevent an address change for operational states of the installation which are not temperature-dependent, wherein the other inputs of said subsequent NOR gates receive the output signals from said counter after passage through inverters.

24. An apparatus as defined by claim 2, further comprising a synchronizer circuit for receiving transduced signals related to the conditions of said installation, and for rendering said signals mutually synchronized, said synchronizing circuit including first and second flip-flops connected in series, the clock input of said first flip-flop receiving said pulse train related to temperature and the output of said second flip-flop being connected to an input of a subsequent NOR gate the other input of which receives a signal from range sensing means indicating that the upper limit of said counter has been reached a second time, the output of said NOR gate being connected to one of the inputs of a subsequent NAND gate the other inputs of which receive a signal defining the gating time of said counter and a signal from a pulse generating circuit including the temperature-dependence of cyclically selected operational states of the installation.

25. An apparatus as defined by claim 24, wherein said gating circuit includes an AND gate connected to the counting input of a first partial counter of 4-bits and a second partial counter, said first and second partial counters constituting said counter.

* * * * *